United States Patent [19]

Maudal

[11] Patent Number: 4,674,029
[45] Date of Patent: Jun. 16, 1987

[54] OPEN-LOOP CONTROL SYSTEM AND METHOD UTILIZING CONTROL FUNCTION BASED ON EQUIVALENT CLOSED-LOOP LINEAR CONTROL SYSTEM

[75] Inventor: Inge Maudal, Claremont, Calif.

[73] Assignee: General Dynamics, Pomona Division, Pomona, Calif.

[21] Appl. No.: 677,762

[22] Filed: Dec. 3, 1984

[51] Int. Cl.$^4$ .................. G05B 13/04; G05B 17/02
[52] U.S. Cl. ............................... 364/148; 318/561; 364/164; 364/178; 364/194; 364/149
[58] Field of Search ............... 364/148, 149, 150, 151, 364/164, 165, 176, 177, 178, 179, 194; 318/561

[56] References Cited

U.S. PATENT DOCUMENTS

| | | | |
|---|---|---|---|
| 2,712,414 | 7/1955 | Ziebolz et al. | 235/61 |
| 3,287,615 | 11/1966 | Smyth | 318/28 |
| 3,446,946 | 5/1969 | Andeen | 235/150.1 |
| 3,578,957 | 5/1971 | Gatlin et al. | 235/150.1 |
| 3,591,779 | 7/1971 | Sutherland, Jr. et al. | 235/151.1 |
| 3,622,767 | 11/1971 | Koepcke | 235/150.1 |
| 3,767,900 | 10/1973 | Chao et al. | 364/164 X |
| 3,838,257 | 9/1974 | Ross | 364/149 |
| 3,958,109 | 5/1976 | Doherty et al. | 235/151 |
| 4,054,780 | 10/1977 | Bartley et al. | 364/164 X |
| 4,069,413 | 1/1978 | Rutledge et al. | 364/164 |
| 4,136,396 | 1/1979 | Hansford | 364/554 |
| 4,151,589 | 4/1979 | Ross | 364/149 X |
| 4,156,170 | 5/1979 | Strunc | 318/696 |
| 4,338,659 | 7/1982 | Kurakake | 364/176 X |
| 4,466,054 | 8/1984 | Shigemasa et al. | 364/162 |

Primary Examiner—Joseph Ruggiero
Attorney, Agent, or Firm—Neil F. Martin; Edward B. Johnson

[57] ABSTRACT

An open-loop system for controlling a plant, including a sampling circuit for providing an actuating signal as a series of impulse signals, and a computer for providing a control signal to operate the plant in response to the actuating signal in accordance with a control function defined by a control algorithm based upon a calculated response of the plant in an equivalent closed-loop linear control system. The computer provides the control signal as a function of time following the application of each impulse signal. The control algorithm is a time-domain algorithm based upon an inverse LaPlace transform of the equivalent system. The interval between impulse signals, as defined by the sampling rate, is on the order of the time constant of the equivalent system; and the computation speed of the computer is sufficiently fast to provide a control signal that is effectively continuous relative to the operating dynamics of the plant.

16 Claims, 6 Drawing Figures

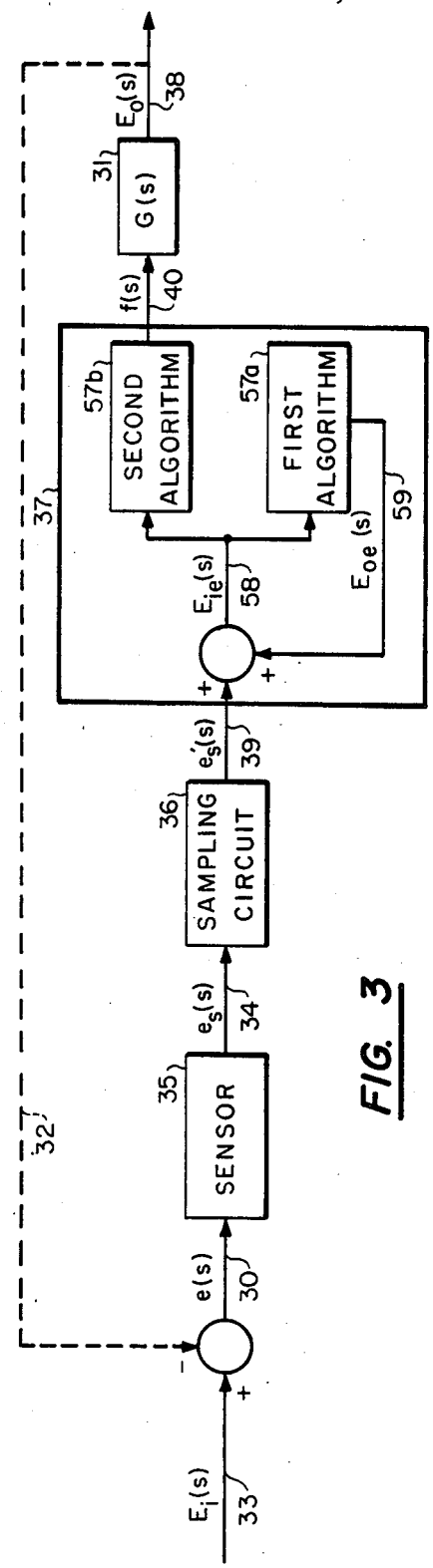
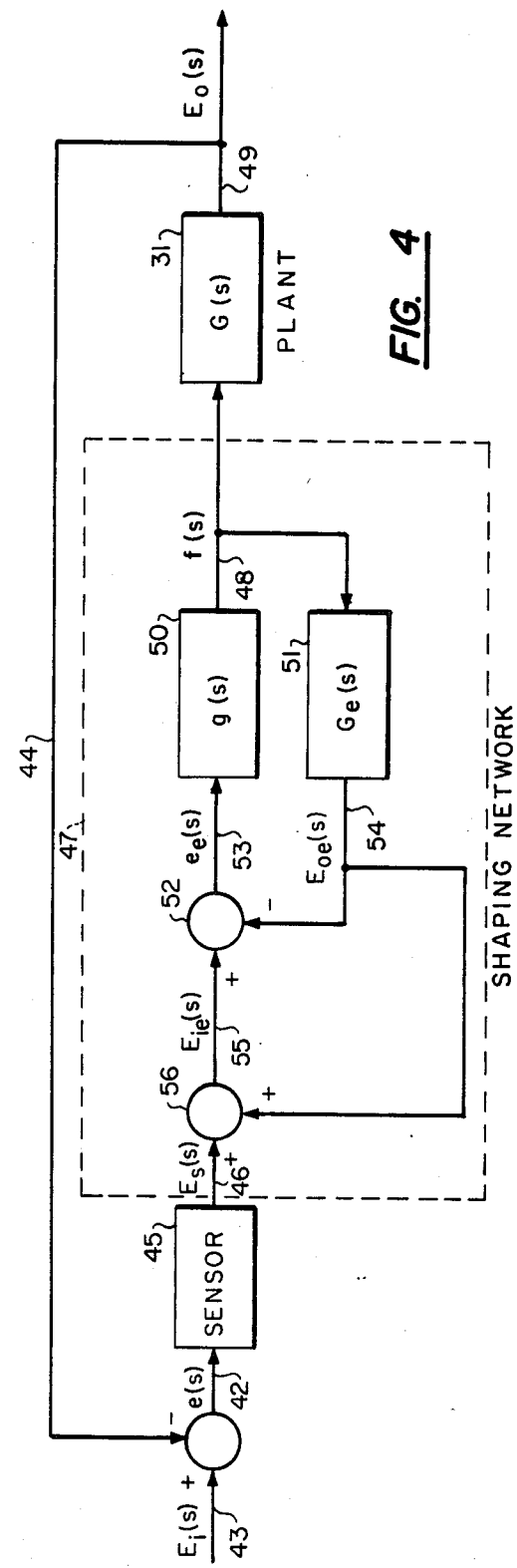
FIG. 3
FIG. 4

OPEN-LOOP CONTROL SYSTEM AND METHOD UTILIZING CONTROL FUNCTION BASED ON EQUIVALENT CLOSED-LOOP LINEAR CONTROL SYSTEM

BACKGROUND OF THE INVENTION

The present invention generally pertains to control systems and is specifically directed to improvements in control systems for plants that typically are operated in a closed-loop manner.

A "plant" is defined as a physical operating unit or system. In closed-loop systems the operation of the plant is controlled by a control signal f(s) which is derived in accordance with a control function based upon a measured response of the plant. In some prior art closed-loop control systems, a model of the plant is simulated in a closed-loop control system on a continuous basis and the response of the model is compared with the response of the actual plant to effect corrections.

A physical system is characterized by system state variables. For example, a missle airframe comprises a system where missile spatial attitude is one state variable and the tail actuators and aerodynamic panels providing the necessary forces acting upon the airframe are other state variables. The system may be represented mathematically via differential equations or in block diagram form, as in FIG. 1, where the blocks express the physical system via mathematical transformations, such as LaPlace transforms.

FIG. 1 shows an exemplary closed-loop linear control system for an airframe 10 having an operating characteristic G(s), which is controlled by a servo 11 having a constant gain characteristic (K). The servo 11 and airframe 10 constitute the "plant" in the system of FIG. 1.

In imposing control over the airframe 10, a sensor 12, such as a gyro, senses a state variable, such as the airframe attitude $E_o(s)$. The electrical output of the gyro $E_{os}(s)$ is then combined differentially with an electrical signal representing the desired attitude $E_i(s)$. The resulting difference, represented by an error signal e(s), is manipulated electrically in accordance with a shaping network 13 to yield a specific behavior as a function of time. The precise behavior is prescribed mathematically and implemented electrically as a control signal f(s). The "electrical" implementation is sometimes accomplished through use of a digital computer, wherein the shaping network 13 performs a control function g(s) defined by a control algorithm. The control signal f(s) represents the desired position of the tail panels which will result in aerodynamic forces which cause the airframe attitude $E_o(s)$ to achieve the desired airframe attitude $E_i(s)$.

SUMMARY OF THE INVENTION

The present invention is an open loop control system and method that provides a control signal to operate the plant in response to the actuating signals in accordance with a control function defined by a control algorithm based upon a calculated response of the plant in an equivalent closed-loop linear control system. Accordingly, the present invention uses open-loop control to achieve the same response as achieved in a closed-loop system.

Various advantages and features of the present invention, including the ability to function without output sensing instruments, are discussed in relation to the description of the preferred embodiments.

BRIEF DESCRIPTION OF THE DRAWING

FIG. 3 is a block diagram of a preferred embodiment of the open-loop control system of the present invention in which the control algorithm is based upon measurement of an error signal in an equivalent closed-loop linear control system where the error signal is the difference between input and output signals.

FIG. 4 is a block diagram of the equivalent closed-loop linear control system upon which the control algorithm for the system of FIG. 3 is based.

DESCRIPTION OF THE PREFERRED EMBODIMENTS

The preferred embodiments of the open-loop control system of the present invention are described in relation to their respective equivalent closed-loop linear control systems. LaPlace notation is used throughout in referring to the various signals, operating characteristics and control functions referred to herein.

Figure 1:
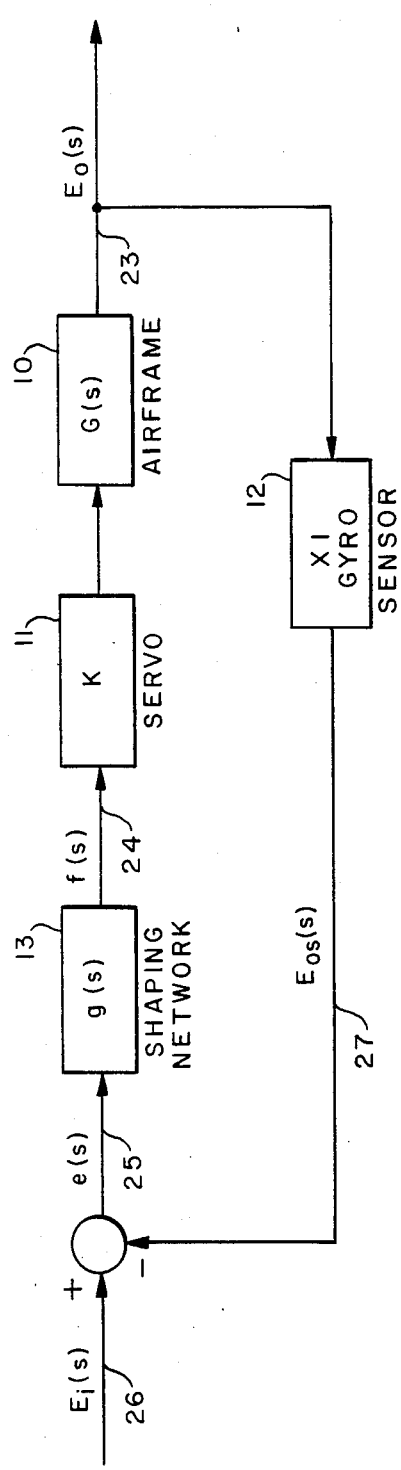
FIG. 1 is a block diagram of a prior art closed-loop linear control system.
Figure 2:
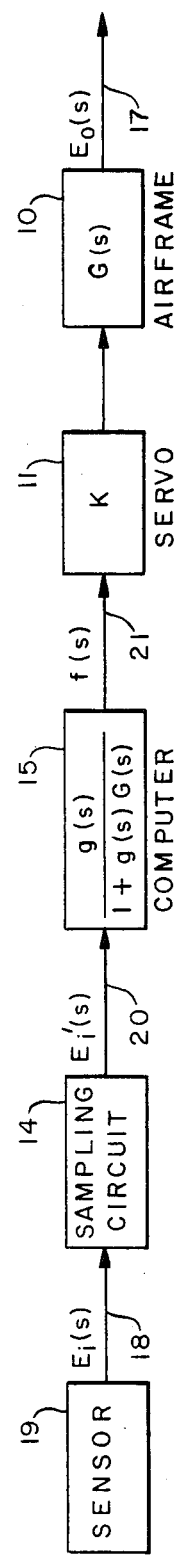
FIG. 2 is a block diagram of a preferred embodiment of an open-loop control system according to the present invention in which the actuating signal represents the desired output response of the plant, wherein the control algorithm of the open-loop system is based upon an equivalent closed-loop linear control system shown in FIG. 1.

One preferred embodiment shown in FIG. 2 includes a sampling circuit 14 and a computer 15 connected in series with a plant consisting of a servo 11 and an airframe 12 corresponding to the servo 11 and airframe 12 in the closed-loop system of FIG. 1. The airframe 12 provides an output response represented by $E_o(s)$ on line 17. The control system is responsive to a continuous system input signal $E_i(s)$ provided on line 18 by a sensor 19.

The sampling circuit 14 periodically samples the system input signal $E_i(s)$ provided on line 18 at a predetermined sampling rate to provide an actuating signal $E_i'(s)$ on line 20 as a series of impulse signals corresponding to samples of the sensed input signal $E_i(s)$, the prime superscript represents an impulse signal.

The computer 15 provides a control signal f(s) on line 21 to operate the servo 11 and airframe 10 in response to the actuating signal $E_i'(s)$ on line 20 in accordance with the following equation:

$$f(s) = g(s)E_i'(s) \div [1 + g(s)G(s)]. \qquad \text{(Eq. 1)}$$

The control function of the computer 15 is defined by a control algorithm based upon the performance of the airframe 10 in the equivalent closed-loop linear control system of FIG. 1.

In the equivalent closed-loop system of FIG. 1, the airframe response $E_o(s)$ on line 23 is produced by a control signal f(s) on line 24 in accordance with the operating characteristic G(s) of the airframe 10 and the control function g(s) of the shaping network 13. The control signal f(s) is derived from an error signal e(s) on line 25 in accordance with the control function g(s) of the shaping network 13. The error signal e(s) is provided on line 25 in response to a differential combination of the system input signal $E_i(s)$ on line 26 and the airframe response $E_o(s)$ as provided on line 27 by the sensor 12 as a sensed electrical signal $E_{os}(s)$. The control function g(s) is derived through known linear systhesis techniques.

In accordance with the present invention, the control signal f(s) provided by the computer 15 on line 21 in the open-loop system of FIG. 2 must be the same as the time-based control signal f(s) provided by the shaping network 13 on line 24 in the closed-loop control system of FIG. 1. This is accomplished in the open loop system of FIG. 2 by adopting the computer 15 to process the impulse signals on line 20 in accordance with a control algorithm that is a time-domain algorithm based upon an inverse LaPlace transform of the equivalent closed-loop system of FIG. 1. The application of the actuating signal $E_i'(s)$ as a series of impulse signals on line 20 to the computer 15 causes the control signal f(s) on line 21 to be uniquely determined as a function of time following the application of each impulse signal. As a result, it is possible to define the control algorithm for the computer 15 as a control function between sample times, which leads to the desired response $E_o(s)$ of the airframe 10, as follows:

$$E_o(s) = g(s)G(s)E_i'(s) \div [1+g(s)G(s)] \quad \text{(Eq. 2)}$$

The time response to a step input is readily obtained from the inverse LaPlace transform, i.e.

$$f(t) = A_0 + A_1 e^{-a_1 t} + A_2 \sin(\omega t + \phi)e^{-a_2 t} + \ldots \quad \text{(Eq. 3)}$$

In order to avoid evaluation of initial conditions of the control system, consider the sampled input signal E'(s) on line 20 to be a series of impulse signals. The inputs over time may be considered a summation of a series of impulses.

Similarly, the system response is the summation of the ressponses to a series of impulse inputs.

The forcing function is now the time function consisting of the summation of responses to each individual step input. Thus $$f(t) = \Sigma A0_n + \Sigma A1_n e^{-a1_n t} + \Sigma A2_n \sin(\omega t + \phi)e^{-a2_n t} + \ldots \quad \text{(Eq. 4)}$$

This is readily implemented with a digital computer.

Note that the form of Equation 4 is characteristic of the response of a closed loop control system. Thus the same form may be used to compute any function of interest which is imbedded within a closed loop control system.

Consider the exponential terms first. Thus $$A = A_0 e^{-a(t-T_0)} \quad \text{(Eq. 5)}$$

where $T_0$ represents the starting time and $A_0$ is the initial value at start time. By virtue of the discrete incrementation of time, the time following the start time is expressed as $$t_N - T_0 = N\Delta \quad \text{(Eq. 6)}$$

where
 $\Delta$ is the computation interval and
 N is number of increments following the start.
Now $$A_N = A_0 e^{-a(N\Delta)} \quad \text{(Eq. 7)}$$

Consider now the value at the next computational increment.

$$A_{N+1} = A_0 e^{-a(N\Delta + \Delta)} \quad \text{(Eq. 8)}$$

$$A_{N+1} = A_0 e^{-a(N\Delta)} e^{-a(\Delta)} \quad \text{(Eq. 9)}$$

or $$A_{N+1} = A_N \cdot e^{-a(\Delta)} \quad \text{(Eq. 10)}$$

Note that the parameter a and $\Delta$ are known constants. Therefore $$e^{-a\Delta} = C \quad \text{(Eq. 11)}$$

is also a constant, and the iterative solution for the exponential is simply $$A_{N+1} = A_N \cdot C \quad \text{(Eq. 12)}$$

This is a very simple algebraic operation for the digital computer.

Following the same process with the sine term, we have $$B = E_0 \sin(\omega(t - T_0) + \phi) \quad \text{(Eq. 13)}$$

$$B = E_0 \sin(\omega N\Delta + \phi) \quad \text{(Eq. 14)}$$

Recognizing the nature of trigonometric functions, consider both sine as well as cosine terms.

Note that the term $\omega N\Delta$ in Equation 14 represents a phase angle.

Thus the signal at time N+1 is merely the signal at time N shifted in phase by the angle $\omega\Delta$. Thus if $$S_N = E_0 \sin(\omega N\Delta + \phi) \quad \text{(Eq. 15)}$$

$$C_N = E_0 \cos(\omega N\Delta + \phi) \quad \text{(Eq. 16)}$$

then $$S_{N+1} = E_0 \sin((\omega N\Delta + \phi) + \omega\Delta) \quad \text{(Eq. 17)}$$

$$C_{N+1} = E_0 \cos((\omega N\Delta + \phi) + \omega\Delta) \quad \text{(Eq. 18)}$$

i.e., the signal is shifted in phase between each computation interval.

Using the trigonometric expressions for sine and cosine of sum of angles, $$S_{N+1} = E_0 \sin(\omega N\Delta + \phi)\cos(\omega N\Delta + \phi) + E_0 \cos(\omega N\Delta + \phi)\sin(\omega\Delta) \quad \text{(Eq. 19)}$$

$$C_{N+1} = E_0 \cos(\omega N\Delta + \phi)\cos(\omega N\Delta + \phi) - E_0 \sin(\omega N\Delta + \phi)\sin(\omega\Delta) \quad \text{(Eq. 20)}$$

or substituting Equations 15 and 16, $$S_{N+1} = S_N \cos(\omega\Delta) + C_N \sin(\omega\Delta) \quad \text{(Eq. 21)}$$

$$C_{N+1} = C_N \cos(\omega\Delta) + S_N \sin(\omega\Delta) \quad \text{(Eq. 22)}$$

Note that $$C_S = \sin(\omega\Delta) \quad \text{(Eq. 23)}$$

$$C_c = \cos(\omega\Delta) \quad \text{(Eq. 24)}$$

are constants and need not be calculated as part of the algorithm.

When the exponential term from Equation 11 is included, the iterative solution for the last term in Equation 4 is provided.

$$S_{N+1} = (S_N C_c + C_N C_s) \cdot C \quad \text{(Eq. 25)}$$

$$C_{N+1} = (C_N C_c - S_N C_s) \cdot C \quad \text{(Eq. 26)}$$

Equations 12, 25 and 26 are the algorithm used in the iterative solution for a desired function. This process is performed at the computer clock frequency. It is assumed that the clock frequency is high enough so that the functions may be considered continuous.

The algorithm is updated every sample interval. (The sample interval is fixed by the sampling circuit 14 and is slower in frequency than the clock frequency). Since the algorithm is the summation of impulse responses of the closed loop system, the update is merely the summation of impulse responses at $t = t_0$, or at each update time. Thus it is simply the addition of the new impulse response evaluated at $t = 0$ to the existing value of the iterative solution.

In the case of the exponential term, the update is a simple addition. Thus $$A_{N+} = A_N + A_1 \cdot E \quad \text{(Eq. 27)}$$

where

E is the input,
$A_{N+}$ is the updated value,
$A_N$ is the residual from the interative loop (Equation 11),
$A_1$ is the constant from Equation 4.

In the case for the sine term, the update involves a phase shift, $\phi$, at update time. This is handled by updating both the sine and cosine terms. Thus $$S_{N+} = S_N + A_2 \cdot S_i \cdot E \quad \text{(Eq. 28)}$$

$$C_{N+} = C_N + A_2 \cdot C_i \cdot E \quad \text{(Eq. 29)}$$

where

E is the input,
$S_{N+}$ is the updated value of sine term,
$C_{N+}$ is the updated value of cosine term,
$S_N$ is the residual from iterative loop of sine term,
$C_N$ is the residual from iterative loop of cosine term,
$A_2$ is the constant from Eq. 3.2-3,
$S_i$ is $\sin(\phi)$,
$C_i$ is $\cos(\phi)$.

The validity of this may be shown by considering the signal at the next computation interval. Let $$S_{N+} = E_0 \sin(\omega N\Delta + \phi) + A_2 E \sin\phi \quad \text{(Eq. 30)}$$

$$C_{N+} = E_0 \cos(\omega N\Delta + \phi) + A_2 E \cos\phi \quad \text{(Eq. 31)}$$

then $$S_{N+1} = E_0 \sin\{(\omega N\Delta + \phi)\cos + \cos(\omega N\Delta + \phi)\sin(\omega\Delta)\} \quad \text{(Eq. 32)}$$

and $$S_{N+1} = E_0\{\sin(\omega N\Delta + \phi)\cos\omega\Delta + \cos(\omega N + \phi)\sin(\omega\Delta)\} + \ldots + A_2 E_0\{\sin\phi\cos(\omega\Delta) + \cos\phi\sin(\omega\Delta)\} \quad \text{(Eq. 33)}$$

$$S_{N+1} = \{E_0 \sin(\omega\Delta + \phi) + A_2 E_0 \sin(\phi)\}\cos(\omega\Delta) + \ldots + \{E_0 \cos(\omega N\Delta + \phi) + B\cos\phi\}\sin(\omega\Delta) \quad \text{(Eq. 34)}$$

$$S_{N+1} = S_N + C_c + C_N S_c \quad \text{(Eq. 35)}$$

Thus it is shown that the postulated addition of the new impulse in the form of Equation 28 is valid. A similar argument is true for the cosine term.

In order to obtain a better overview of the algorithm duplicating the function of time, it is shown in update and iterative mode.

Update mode $$K_{N+} = K_N + A_0 \cdot E_0$$

$$A_{N+} = A_N + A_1 \cdot E_0$$

$$S_{N+} = S_N + A_2 \cdot S_i \cdot E_0$$

$$C_{N+} = C_N + A_2 \cdot C_i \cdot E_0 \quad \text{(Eq. 36)}$$

Iterative mode $$K_{N+1} = K_N$$

$$A_{N+1} = A_N \cdot C$$

$$S_{N+1} = (S_N \cdot C_c + C_N \cdot C_s) \cdot C$$

$$C_{N+1} = (C_N \cdot C_c - S_N \cdot C_s) \cdot C \quad \text{(Eq. 37)}$$

The derivation of the implementing algorithms is based on the ideal plant. That is, it is assumed that the parameters at the plant are known.

When parameter variations induce a mismatch between the model and the actual plant there is an expected difference in overall performance. However, the effect is similar to variations induced by parameter variance in a classical closed loop system. Furthermore, the imperfect system is capable of analysis with attendant examination of system tolerances.

Referring again to the control system of FIG. 2, the predetermined sampling rate of the sampling circuit 14 may be so low that the sampling interval defined by the sampling rate is on the order of the time constant of the equivalent system of FIG. 1. The computation speed of the computer 15 is sufficiently fast in relation to the sampling rate to provide a control signal f(s) on line 21 that is effectively continuous relative to the operating dynamics of the servo 11 and the airframe 10.

In an alternative preferred embodiment illustrated in FIG. 3, the actuating signal is representative of an error in the response of an open-loop linear control system. Such an error is represented figuratively by the dashed lines in FIG. 3, which illustrate an error signal e(s) being provided on line 30 as the result of a differential combination of the actual response $E_o(s)$ of a plant 31 as provided via a feedback line 32 and the desired response $E_i(s)$ of the plant 31 as provided on line 33. In the open-loop system of the present invention the sensed signal $e_s(s)$ provided on line 34 from a sensor 35 is provided as a result of a direct measurement by the sensor 35 of an error in the response of the plant 31. Such direct measurement does entail an implied feedback loop or the differential comparison illustrated by the dashed lines in the system of FIG. 3. An example of such a direct measurement is the measurement of the angle between a line of sight to a target and the center line of a missile approaching the target. According to this example, in the open-loop system of FIG. 3, the sensor 35 measures the angle, and the sensed signal $e_s(s)$ provided on line 34 by the sensor 35 represents the measured angle.

The preferred embodiment of FIG. 3 includes a sampling circuit 36 and a computer 37 connected in series with the plant 31. The plant 31 has an actual operating characteristic $G(s)$. The plant 31 provides a response represented by $E_o(s)$ on line 38. The open-loop control system of FIG. 3 is responsive to a continuous sensed "error" signal $e_s(s)$ provided on line 34 by the sensor 35.

The sampling circuit 36 periodically samples the sensed signal $e_s(s)$ on line 34 at a predetermined sampling rate to provide an actuating signal $e_s'(s)$ on line 39 as a series of impulse signals.

In order to determine the control function which controls the operation of the computer 37 to cause the computer 37 to provide the desired control signal on line 40 in the open-loop system of FIG. 3, it is necessary to refer to an equivalent closed-loop linear control system, as shown in FIG. 4 that responds to an error signal $e(s)$, which is provided on line 42 is response to a differential combination of a system input signal $E_i(s)$ on line 43 and a plant response signal $E_o(s)$ provided via a feedback line 44. In the equivalent system, a sensor 45 senses the error signal on line 42 and provides a sensed error signal $e_s(s)$ corresponding thereto on line 46. The portion of the closed-loop system of FIG. 4 within the dashed lines is in effect a shaping network 47 that responds to the actuating sensed error signal $e_s$ on line 46 by providing a control signal $f(s)$ on line 48 for controlling the plant 31.

The shaping network 47 includes an internal closed-loop linear control system, such as that shown in FIG. 1. The closed-loop linear control system contained within the shaping network 47 includes the shaping element 50, having a control function $g(s)$, a response element 51 having an operating characteristic $G_e(s)$ based upon an estimated operating characteristic of the plant 31, and an algebraic unit 52 for differentially combining an estimated response $E_{oe}(s)$ of the plant 31 with an estimated system input signal $E_{ie}(s)$. The algebraic unit 52 provides an estimated actuating error signal $e_e(s)$ on line 53 in response to a differential combination of the estimated plant response signal $E_{oe}(s)$ on line 54 from the response element 51 and the estimated system input signal $E_{ie}(s)$ on line 55. The estimated system input signal on line 55 is derived by an algebraic unit 56 which sums the sensed error signal on line 46 with the estimated plant response signal $E_{oe}(s)$ on line 54.

Referring now to the open-loop control system of FIG. 3, the computer 37 processes the actuating sensed error signal on line 39 in accordance with two algorithms and an algebraic summation to provide the control signal $f(s)$ on line 40. The first algorithm 57a processes a computed estimated system input signal $E_{ie}(s)$ as represented on line 58 to provide an estimated plant response signal $E_{oe}(s)$, as represented on line 59. The estimated system input response signal $E_{ie}(s)$ on line 58 is computed by algebraic summation of the actuating sensed error signal $e_s'(s)$ on line 39 and the estimated plant response signal $E_{oe}(s)$ on line 59. the second algorithm 57b processes the computed estimated system input signal $E_{ie}(s)$ on line 58 to provide the control signal $f(s)$ on line 40. Both algorithms are time-domain algorithms based upon an inverse LaPlace transform of the equivalent closed-loop control system of FIG. 4.

The computer 37 of the system of FIG. 3 causes the control signal $f(s)$ on line 40 to be determined as a function of time in response to the impulse input actuating signal $e_s'(s)$ on line 39 in the same general manner as the computer 15 of the system of FIG. 2 responds to the impulse input signal $E_i'(s)$ on line 20, as described above with reference to Equations 3 through 37.

The predetermined sampling rate of the sampling circuit 36 in the system of FIG. 3 may be so low that the sampling interval defined by the sampling rate is on the order of the time constant of the equivalent system of FIG. 4. The computation speed of the computer 37 in the system of FIG. 3 is sufficiently fast in relation to the sampling rate to provide a control signal $f(s)$ on line 40 that is effectively continuous relative to the operating dynamics of the plant 31.

Figure 5:
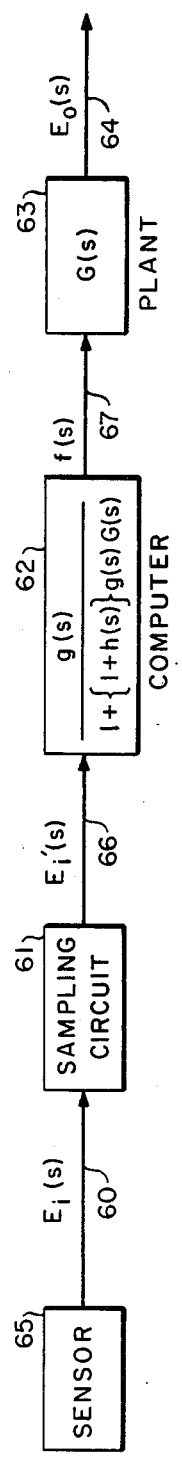
FIG. 5 is a block diagram of a preferred embodiment of the open-loop control system of the present invention in which the control algorithm is based upon an equivalent closed-loop linear control system having compensating means in an additional feedback path.
Figure 6:
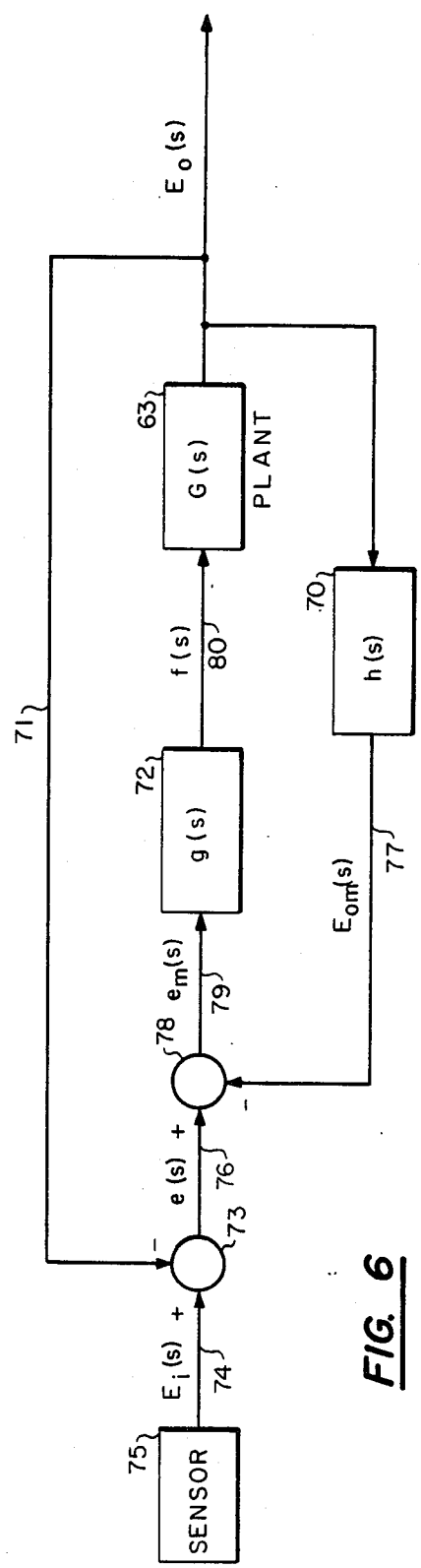
FIG. 6 is a block diagram of the equivalent closed-loop linear control system on which the control algorithm of the system of FIG. 5 is based.

In another alternative preferred embodiment illustrated in FIG. 5, the actuating signal $E_i(s)$ is representative of an input signal to an equivalent closed-loop linear control system having multiple feedback paths, as illustrated in FIG. 6. The open-loop embodiment of FIG. 5 is preferred when the plant is of such complexity as to require multiple feedback paths to provide adequate control. Additional measurement instruments usually are necessarily included in the additional feedback paths of such a closed-loop system.

The preferred embodiment of FIG. 5 includes a sampling circuit 61 and a computer 62 connected in series with a plant 63 having an actual operating characteristic $G(s)$. The plant 63 provides a response represented by $E_o(s)$ on line 64. The open-loop control system of FIG. 5 is responsive to a continuous system input signal $E_i(s)$ provided on line 60 from a sensor 65.

The embodiment of FIG. 5 does not require any additional sensors to effect the additional feedback path included in the closed-loop system of FIG. 6.

The sampling circuit 61 periodically samples the system input signal $E_i(s)$ provided on line 60 at a predetermined sampling rate to provide an actuating signal $E_i'(s)$ on line 66 as a series of impulse signals.

The computer 62 provides a control signal $f(s)$ on line 67 to operate the plant 63 in response to the actuating signal $E_i'(s)$ on line 52 in accordance with the following equation:

$$f(s) = g(s)E_i'(s) \div [1 + \{1 + h(s)\}g(s)G(s)] \quad \text{(Eq. 38)}$$

The control function is defined by a control algorithm which is a time-domain algorithm based upon an inverse LaPlace transform of the equivalent closed-loop linear control system of FIG. 6.

The closed-loop linear control system of FIG. 6 includes a feedback path including a shaping element 70 providing a control function $h(s)$ in addition to the basic closed loop constituted by a feedback line 71 coupled across a series connection of the plant 63, a shaping element 72 and an algebraic unit 73. The shaping element 72 provides a control function $g(s)$. The feedback line 71 provides a response signal $E_o(s)$ of the plant 63 to the algebraic unit 73 where the response signal $E_o(s)$ is differentially combined with a system input control signal $E_i(s)$ on line 74 from a sensor 75 to provide an error signal $e(s)$ on line 76. The additional shaping element 70 shapes the plant response signal $E_o(s)$ to provide a modified response signal $E_{om}(s)$ on line 77. The modified response signal on line 77 is differentially combined with the error signal e(s) on line 76 by a second algebraic unit 78 to provide a modified error $e_m(s)$ on line 79. The shaping element 72 processes the modified error signal $e_m(s)$ on line 79 to provide a control signal f(s) on line 80 for controlling the plant 63.

The computer 62 of the system of FIG. 5 causes the control signal f(s) on line 67 to be determined as a function of time in response to the impulse input actuating signal $E_i'(s)$ on line 66 in the same general manner as the computer 15 of the system of FIG. 2 responds to the impulse input signal $E_i'(s)$ on line 20, as described above with reference to Equations 3 through 37.

The predetermined sampling rate of the sampling circuit 61 in the system of FIG. 5 may be so low that the sampling interval defined by the sampling rate is on the order of the time constant of the equivalent system of FIG. 6. The computation speed of the computer 62 in the system of FIG. 5 is sufficiently fast in relation to the sampling rate to provide a control signal f(s) on line 67 that is effectively continuous relative to the operating dynamics of the plant 63.

Several advantages are provided by the present invention. Stabilization instruments, such as the measurement gyro 12 (FIG. 1), are not needed. The required sample-data rate is much lower than that of a comparable closed loop system. True digital control is achieved. And separate control systems in an overall system may be operated independently rather than interdependently.

What is claimed is:

1. An open-loop system for controlling a plant, comprising:
    actuation means for providing an actuating signal, said actuation means comprising:
        sense means for sensing a condition that a plant is to respond and for providing a continuous sense signal representative of said sensed condition, and
        sample means for periodically sampling said sense signal at a predetermined sampling interval and for providing said actuating signal as a series of impulse signals corresponding to the samples of said sense signal; and
    control means responsive to said actuating signal for providing a control signal to the plant in accordance with a control function defined by a control algorithm based upon a calculated response of a plant in an equivalent closed-loop linear control system, said control means comprising a computer for providing said control signal as a function of time following the application of each impulse signal thereto.

2. A system according to claim 1, wherein the control algorithm is a time-domain algorithm based upon an inverse LaPlace transform of the equivalent closed-loop system.

3. A system according to claim 1,
    wherein the predetermined sampling interval is on the order of the time constant of the equivalent system; and
    wherein the computation speed of the computer is sufficiently fast in relation to the sampling rate to provide a control signal that is effectively continuous relative to the operating dynamics of the plant.

4. A system according to claim 1,
    wherein the sense signal corresponds to an error in the response of the open-loop system.

5. A system according to claim 1, wherein the actuating signal is representative of an input signal to an equivalent closed-loop linear control system having multiple feedback paths.

6. A system according to claim 2,
    wherein the predetermined sampling interval is on the order of the time constant of the equivalent system, and
    wherein the computation speed of the computer is sufficiently fast in relation to the sampling rate to provide a control signal that is effectively continuous relative to the operating dynamics of the plant.

7. A system according to claim 6, wherein the sense signal corresponds to an error in the response of the open-loop system.

8. A system according to claim 7, wherein the actuating signal is representative of an input signal to an equivalent closed-loop linear control system having multiple feedback paths.

9. An open-loop method for controlling a plant, comprising the steps of:
    (a) sensing a condition that a plant is to respond to;
    (b) providing a continuous sense signal representative of said sensed condition;
    (c) periodically sampling the sense signal at a predetermined sampling interval;
    (d) providing an actuating signal comprised of a series of impulse signals corresponding to the samples of the sense signal; and
    (e) providing a control signal in response to said actuating signal to operate a plant in accordance with a control function defined by a control algorighm based upon a calculated response of a plant in an equivalent closed-loop linear control system, said control signal being provided as a functin of time following the application of each impulse signal.

10. A method according to claim 9, wherein the control algorithm is a time-domain algorithm based upon an inverse LaPlace transform of the equivalent closed-loop system.

11. A method according to claim 9,
    wherein the predetermined sampling interval in step (c) is on the order of the time constant of the equivalent system; and
    wherein step (e) further comprises the step of
    (f) computing the control signal sufficiently fast in relation to the sampling rate to provide a control signal that is effectively continuous relative to the operating dynamics of the plant.

12. A method according to claim 9,
    wherein the sense signal provided in step (b) corresponds to an error in the response of the open-loop system.

13. A method according to claim 9, wherein the actuating signal of step (d) is representative of an input signal to an equivalent closed-loop linear control system having multiple feedback paths.

14. A method according to claim 10,
    wherein the predetermined sampling interval in step (c) is on the order of the time constant of the equivalent system; and
    wherein step (e) further comprises the step of
    (f) computing the control signal sufficiently fast in relation to the sampling rate to provide a control signal that is effectively continuous relatiive to the operating dynamics of the plant.

15. A method according to claim 14, wherein the sense signal provided in step (b) corresponds to an error in the response of the open-loop system.

16. A method according to claim 15, wherein the actuating signal of step (d) is representative of an input signal to an equivalent closed-loop linear control system having multiple feedback paths.

* * * * *